No. 778,822.　　　　　　　　　　　　　　　　　　　Patented December 27, 1904.

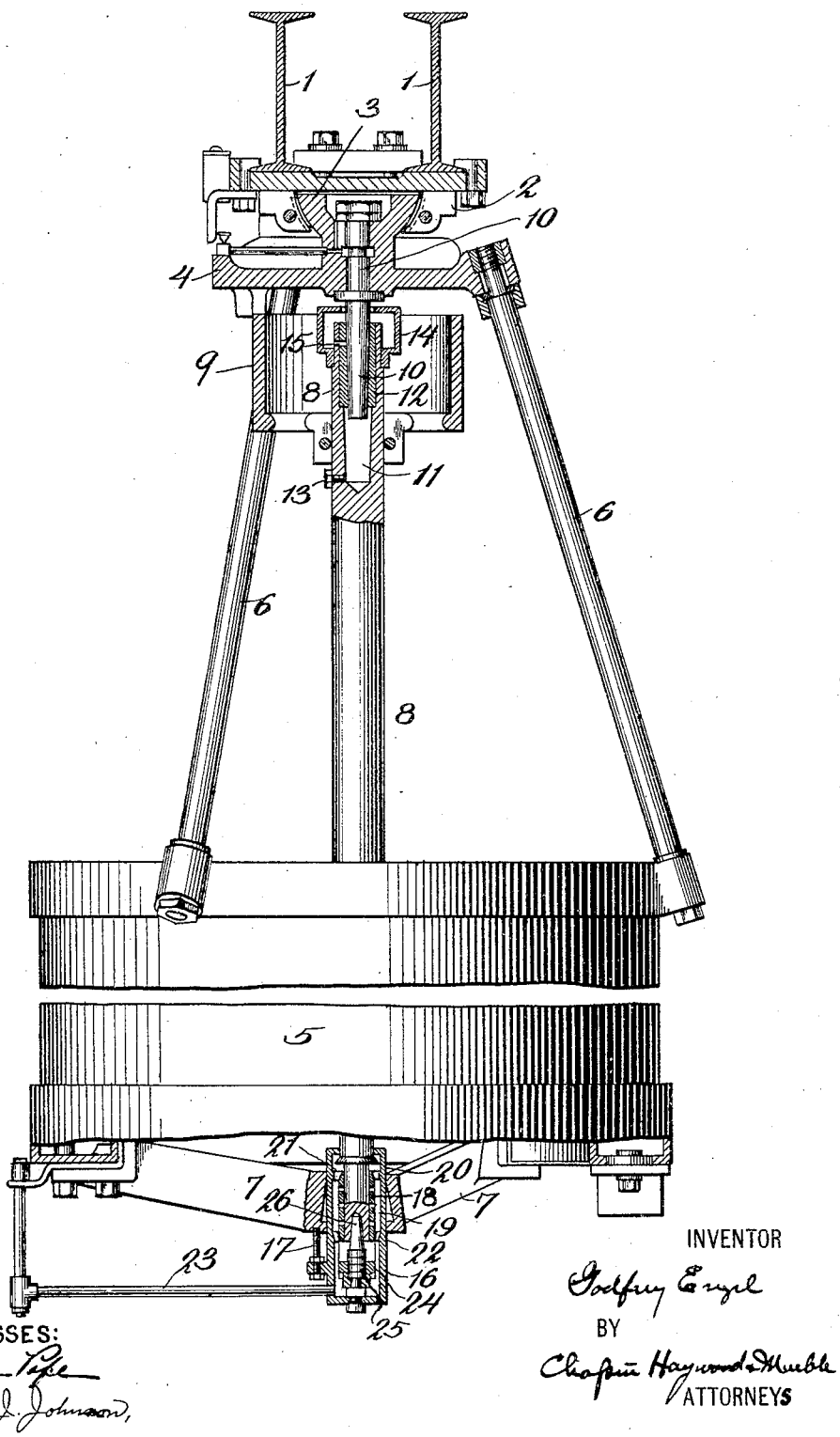

UNITED STATES PATENT OFFICE.

GODFREY ENGEL, OF BALTIMORE, MARYLAND.

BEARING.

SPECIFICATION forming part of Letters Patent No 778,822, dated December 27, 1904.

Original application filed September 1, 1900, Serial No. 28,852. Divided and this application filed November 25, 1903. Serial No. 182,566.

*To all whom it may concern:*

Be it known that I, GODFREY ENGEL, a citizen of the United States, residing in the city of Baltimore and State of Maryland, have invented certain new and useful Improvements in Bearings; and I do hereby declare the following to be a full, clear, and exact description of the invention, such as will enable others skilled in the art to which it appertains to make and use the same.

My invention relates to improvements in bearings of centrifugal machines; and it consists in a novel construction of the head and foot or step bearings of such machines and the parts associated therewith, whereby the lubrication of such bearings is facilitated.

The object of my invention is to improve the lubrication of the bearings of centrifugal machines.

I will now proceed to describe my invention with reference to the accompanying drawing, in which is shown an elevation of a centrifugal machine embodying my invention, the upper and lower bearings thereof being sectioned, and will then point out the novel features in claims.

The machine shown in the said drawing is of the suspension type, being suspended from I-beams 1 1 by means of a suspension-socket 2, which receives the spherically-curved head 3 of the suspension-bracket 4 of the machine. From this bracket 4 the curb 5 is suspended by rods 6. The curb is provided with spider-arms 7, which support the step-bearing of the machine, and therefore the revolving basket-shaft 8, upon which the basket is mounted, said basket being concealed in the drawing by the curb 5. The bracket 4, curb 5, rods 6, and spider-arms 7 constitute a frame for supporting the basket-shaft.

Upon the shaft 8 is a belt-pulley 9, by which said shaft may be driven. As centrifugal machines have usually been constructed in the past the revolving shaft of the machine has been journaled at both ends in bearings which surround the shaft. This construction is objectionable, because the wear upon that bearing which is in proximity to the belt-pulley is greater in one direction than in the other, owing to the tension of the belt. Such uneven wear of the bearing is a fruitful source of trouble. In this machine such wear is avoided by forming the upper bearing, which is closest to the belt-pulley, in the shaft itself, the journal being a pivot-pin carried by the suspension-bracket 4. 10 designates this pin. Its lower or journal portion is slightly tapered and fits within the recess 11 in the upper portion of the shaft 8. The upper portion of this recess is of sufficient diameter to receive a bearing-bushing 12, of antifriction metal. The lower portion of the recess 11 forms an oil-reservoir, and in the shaft there is a drainage-opening normally closed by a screw-plug 13.

An oil-cup 14 is mounted upon the upper end of the shaft 8 and surrounds such upper end. An oil-passage 15 extends through the shaft 8 and bushing 12 and serves to transfer oil from the cup 14 to the surface of the journal-pin. When the machine is in operation, centrifugal force throws the oil from the recess 11 between the wearing-surfaces into the cup 14, which is of sufficient size to hold all oil so thrown up. When the machine comes to rest, the oil drains back from the cup 14 into the recess 11. The wearing-surfaces are thus kept thoroughly lubricated.

The construction of the step-bearing of the machine is as follows: The spider 7 carries a bearing-cup 16, adjustable in height by means of studs 17, only one of which is seen in the drawing. Within said cup is a bearing-bushing 18, forming a bearing for the lower end of the shaft 8. Between said bushing 18 and the cup 16 there is an oil-chamber 19, and perforations in the bushing serve to lead the oil from said chamber to the journal. The cup 16 is extended above the bushing 18 to form an oil-cup 20, which cup is connected to the oil-chamber 19 by oil-holes 21, and the chamber 19 is connected by similar holes 22 with the lower portion of the cup 16. An oil-pipe 23, connected to the cup 16, serves to supply oil thereto. This pipe is provided at its upper end with a plug, by which it is closed normally. The cup 16 contains and supports a bearing-block 24, within which are a number of bearing-buttons 25 25, and in the lower end of the shaft 6 is a removable step-piece 26. The construction of this portion of the step-bearing is that which is customary in centrifugal machines. Adjustment of the bearings is obtained by means of the studs 17 and also, if desired, by means of the nuts which hold the journal-spindle 10 in place.

In another application for Letters Patent, filed September 1, 1900, Serial No. 28,852, of which this is a division, I have claimed a bearing for centrifugal machines comprising a stationary journal-pin located within a socket at one end of the shaft of the machine and tapering toward the other end thereof, also a suspension-framework carrying guide and supporting bearings for the lower end of the shaft in connection with a downwardly-tapering journal-pin fitting into a bearing-recess in the upper end of the shaft. Therefore such inventions are not claimed herein.

What I claim is—

1. The combination with the frame of the machine having a bearing for a shaft, of a revolving shaft for carrying the basket, revolubly mounted at its lower end in said bearing, and having at its upper end a bearing-recess and oil-reservoir, a downwardly-tapering journal-pin fitting into such bearing-recess, an oil-cup surrounding the upper portion of the shaft, there being an oil-passage connecting the cup with said bearing-recess.

2. The combination with a support for the lower end of the basket-shaft, of a bearing-cup carried by such support, an oil-supply pipe connected with such cup, a step-bearing for the shaft within said cup, and a bearing-bushing likewise within said cup, supported thereby, and surrounding a journal on said shaft, said cup and bushing having between them an oil-reservoir communicating with the oil-space in the lower portion of the cup and the bearing-bushing having perforations extending from such oil-reservoir to the wearing-surface.

3. The combination with a support for the lower end of the basket-shaft, of a bearing-cup, carried by such support, an oil-supply pipe, connected with such cup, a step-bearing for the shaft within said cup, and a bearing-bushing likewise within said cup, supported thereby, and surrounding a journal on said shaft, said cup and bushing having between them an oil-reservoir communicating with the oil-space in the lower portion of the cup, said bearing-bushing having perforations extending from such oil-reservoir to the wearing-surfaces, and the bearing-cup having an oil-cup, above the bearing-bushing, adapted to contain oil forced upward by centrifugal force, and communicating with the oil-space below.

In testimony whereof I hereunto affix my signature in the presence of two witnesses.

GODFREY ENGEL.

Witnesses:
HOWARD D. ADAMS,
C. JOHN BEERNKES.